US007895428B2

(12) United States Patent
Boland, IV et al.

(10) Patent No.: US 7,895,428 B2
(45) Date of Patent: Feb. 22, 2011

(54) APPLYING FIRMWARE UPDATES TO SERVERS IN A DATA CENTER

(75) Inventors: James F. Boland, IV, Apex, NC (US);
Simon C. Chu, Chapel Hill, NC (US);
Gregory W. Dake, Durham, NC (US);
Eric R. Kern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 11/864,130

(22) Filed: Sep. 28, 2007

(65) Prior Publication Data

US 2009/0089567 A1   Apr. 2, 2009

(51) Int. Cl.
*G06F 15/177* (2006.01)
*G06F 9/00* (2006.01)
*G06F 15/00* (2006.01)
*G06F 11/00* (2006.01)
*G06F 9/445* (2006.01)

(52) U.S. Cl. ............................... 713/2; 713/1; 709/222; 712/28; 714/3; 714/36; 717/176

(58) Field of Classification Search .................. 713/1, 713/2; 709/222; 712/28; 714/3, 36; 717/176
See application file for complete search history.

(56) References Cited

U.S. PATENT DOCUMENTS

| | | | | |
|---|---|---|---|---|
| 5,966,301 | A * | 10/1999 | Cook et al. ................ | 700/3 |
| 6,237,091 | B1 | 5/2001 | Firooz et al. | |
| 6,560,703 | B1 | 5/2003 | Goodman | |
| 6,675,258 | B1 * | 1/2004 | Bramhall et al. ............ | 711/114 |
| 6,738,801 | B1 * | 5/2004 | Kawaguchi et al. .......... | 709/208 |
| 6,789,157 | B1 | 9/2004 | Lilja et al. | |
| 6,842,857 | B2 | 1/2005 | Lee et al. | |
| 7,055,148 | B2 | 5/2006 | Marsh et al. | |
| 7,065,673 | B2 | 6/2006 | Subramaniam et al. | |
| 7,103,641 | B2 | 9/2006 | Brannock | |

(Continued)

OTHER PUBLICATIONS

ITOH; System Firmware Update Method before Rebooting the Operating System; RD v42 n425 Sep. 1999 article 42586; 1999; AAA99A060459; Japan.

(Continued)

*Primary Examiner*—Stefan Stoynov
(74) *Attorney, Agent, or Firm*—Edward J. Lenart; Cynthia G. Seal; Biggers & Ohanian, LLP

(57) ABSTRACT

Applying firmware updates to servers in a data center, the servers including one or more active servers and a standby server, each server mapped to separate remote computer boot storage, including applying the firmware updates to the standby server; selecting an active server for firmware updating; powering off the selected active server by the system management server; remapping the standby server to the remote computer boot storage for the selected active server; rebooting the standby server from the remote computer boot storage for the selected active server, designating the standby server as an active server; remapping the selected active server to the remote computer boot storage formerly mapped to the standby server; and rebooting the selected active server from the remote boot storage formerly mapped to the standby server, designating the selected active server as a standby server.

16 Claims, 2 Drawing Sheets

U.S. PATENT DOCUMENTS

| | | |
|---|---|---|
| 7,185,191 B2 | 2/2007 | Bosley et al. |
| 7,197,634 B2 | 3/2007 | Kruger et al. |
| 7,240,188 B2 * | 7/2007 | Takata et al. .................. 713/1 |
| 2004/0054883 A1 | 3/2004 | Goodman et al. |
| 2004/0205779 A1 | 10/2004 | Almeida et al. |

OTHER PUBLICATIONS

IQSTOR; Using Nondisruptive Firmware Upgrade For Business Continuance; iQstor, Automated Storage Expertise.

* cited by examiner

APPLYING FIRMWARE UPDATES TO SERVERS IN A DATA CENTER

BACKGROUND OF THE INVENTION

1. Field of the Invention

The field of the invention is data processing, or, more specifically, methods, apparatus, and products for applying firmware updates to servers in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which advances have been made is firmware upgrades. Current firmware update methods often involve rebooting a machine in order to run software to update the machine. Often several reboots must occur in order to update multiple firmware components. This problem occurs because multiple vendors of the various devices on a server have independent solutions for updating their firmware. A potential solution is to get all the vendors to agree to a standard firmware update mechanism. This solution is extremely difficult to achieve and does not solve the program of legacy machines that need updating. What is needed is a mechanism that works with the existing firmware update solutions to limit the number of reboots required of a server during a firmware upgrade.

SUMMARY OF THE INVENTION

Methods, apparatus, and products are disclosed for applying firmware updates to servers in a data center, where the servers include one or more active servers and a standby server with each server mapped to separate remote computer boot storage, including applying by a system management server the firmware updates to the standby server; selecting by the system management server an active server for firmware updating; powering off the selected active server by the system management server; remapping by the system management server the standby server to the remote computer boot storage for the selected active server; rebooting by the system management server the standby server from the remote computer boot storage for the selected active server, designating the standby server as an active server; remapping by the system management server the selected active server to the remote computer boot storage formerly mapped to the standby server; and rebooting by the system management server the selected active server from the remote boot storage formerly mapped to the standby server, designating the selected active server as a standby server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
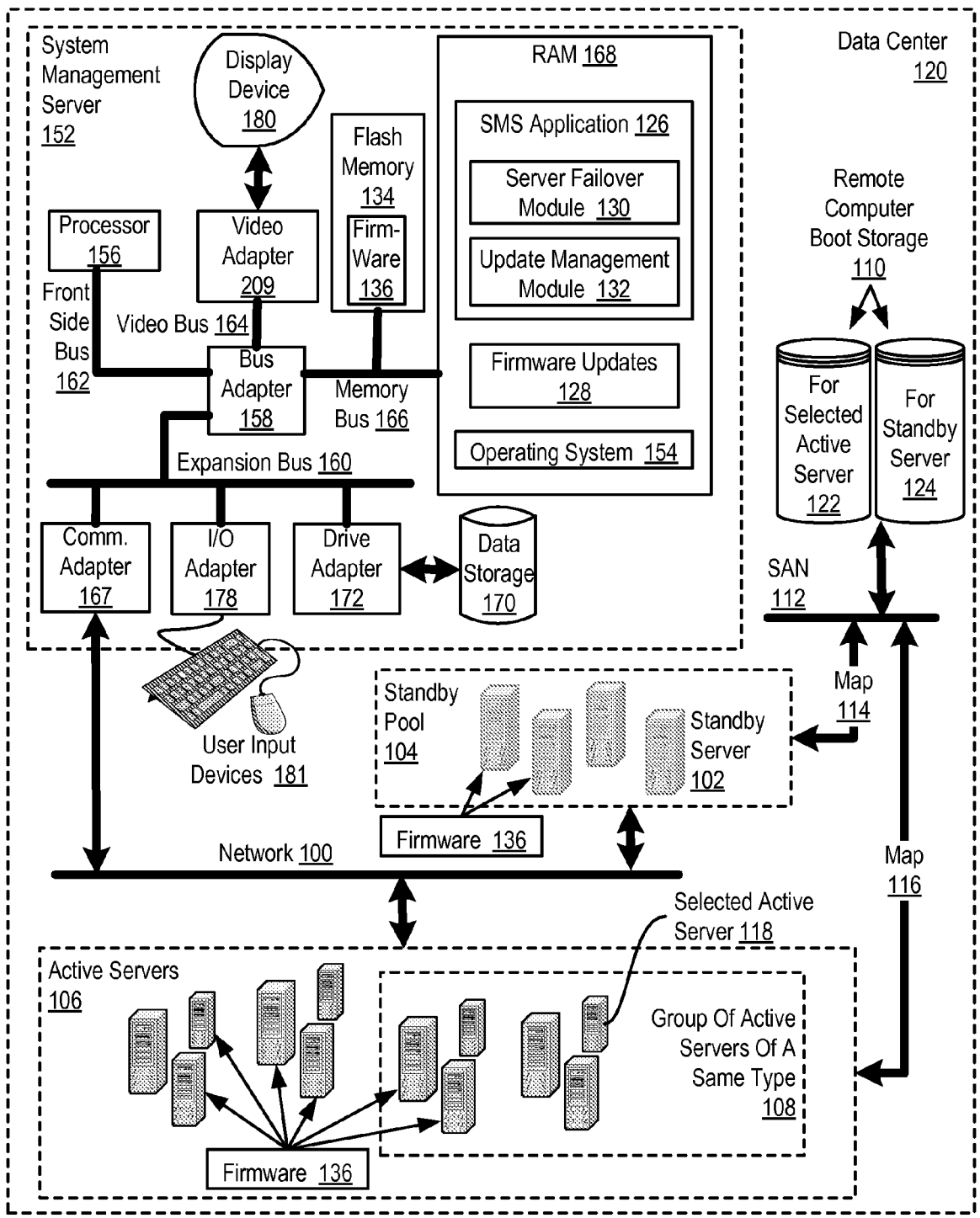
FIG. 1 sets forth a functional block diagram of an exemplary system that can apply firmware updates to servers in a data center according to embodiments of the present invention.

Exemplary methods, apparatus, and products for applying firmware updates to servers in a data center in accordance with the present invention are described with reference to the accompanying drawings, beginning with FIG. 1. FIG. 1 sets forth a functional block diagram of an exemplary system that can apply firmware updates (128) to servers (105, 106) in a data center (120) according to embodiments of the present invention. The data center (120) is a facility used to house mission critical computer systems and associated components. Such a data center includes environmental controls (air conditioning, fire suppression, etc.), redundant/backup power supplies, redundant data communications connections, and high security, highlighted by biometric access controls to compartmentalized security zones within the facility. A data center is a facility used for housing a large amount of electronic equipment, typically computers and communications equipment. A data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers.

A 'server,' as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

The example system of FIG. 1 includes a number of servers, active servers (106), a pool (104) of available standby servers, and a system management server (152). An active server (106) is a server presently in use to provide responses to user requests for data processing services from the data center (120). The example system of FIG. 1 also includes a pool (104) of available standby servers. A standby server is a server that is not presently in use to provide responses to user requests for data processing services from the data center (120) but is available to be brought into active service upon failure of an active computer. All of the servers in this example, the active servers (106) and the standby servers in the pool (104), are mapped to separate remote computer boot storage (110). The separate remote computer boot storage is 'separate' in the sense that each server is mapped to its own remote boot storage. The boot storage is 'remote' in the sense that all the system-level software, such as a kernel and other operating system software, that is needed to operate each server is stored, not on the server itself, but remotely from the server across a storage area network ('SAN') (112) on storage exposed to the servers through the SAN. The only boot-related software on the servers is a thin piece of system-level firmware required to initiate a boot from remote storage.

The SAN (112) is a network architecture that attaches remote computer storage devices such as disk arrays, for example, to servers in such a way that, to the server operating system, the remote storage devices appear as locally attached disk drives. That is, the separate remote boot storage (110) mapped to each server in this example is exposed by the SAN (112) to each server (104, 106) as a separate virtual drive. Such virtual drives are often referred to or referenced by a so-called logical unit number or 'LUN.' A LUN is an address for an individual disk drive and by extension, the disk device itself. A LUN, or the remote storage identified by a LUN, is normally not an entire disk drive but rather a virtual partition (or volume) of a RAID set—in this example a virtual disk drive that organized a portion of RAID (Redundant Array of Inexpensive Drives) storage and presents it to an operating system on a server as an actual disk drive. Most SANs use the SCSI protocol for communication between servers and disk drive devices, though they do not use its low-level physical interface, instead using a mapping layer. The mapping layer may be implemented, for example, with Fibre Channel (Fibre Channel Protocol or 'FCP' is Fibre Channel's SCSI interface), iSCSI (mapping SCSI over TCP/IP), HyperSCSI (mapping SCSI over Ethernet), Advanced Technology Attachment ('ATA') over Ethernet, and InfiniBand (supports mapping SCSI over InfiniBand and/or mapping TCP/IP over InfiniBand).

'Firmware' is a computer program that is embedded in a hardware device, for example a microcontroller or a read-only memory ('ROM') in a server. Firmware is viewed as a computer resource somewhere between hardware and software. Like software, it is a computer program which is executed by a computer, but it is also a piece of hardware. In practical terms, firmware updates can improve the performance and reliability, indeed even the basic available functionality of a server, and many servers benefit from regular firmware updates. Firmware has evolved to mean the programmable content of a hardware device, which can consist of machine language instructions for a server's processor or server configuration settings, for example. A common feature of firmware is that it can be updated post-manufacturing, including electronic updates under program control. Firmware has traditionally been stored in ROM; however cost and performance requirements have driven server manufacturers to adopt various replacements, including non-volatile memory such as EEPROM or 'Flash memory.' Examples of firmware include:

The BIOS (Basic Input/Output System) found in many IBM computers

The 'platform code' found on Itanium and Itanium2 systems, Intel-based Mac OS X machines, and many Intel desktop boards is EFI (Extensible Firmware Interface) compliant firmware The operating system on a router, such as the Linksys WRT54G Open Firmware, used in computers from Sun Microsystems and Apple Computer the ARCS (Advanced Risc Computing Standard) PROM, used in computers from Silicon Graphics RTAS (Run-Time Abstraction Services), used in computers from IBM All of the servers (104, 106, 152) in the example of FIG. 1 includes firmware (136) that can benefit from periodic updates.

The system of FIG. 1 includes a system management server (152) useful in applying firmware updates to servers in a data center according to embodiments of the present invention. The system management server (152) is a server of the data center (120) that automates many of the processes that are required to proactively manage servers in the data center, including capacity planning, asset tracking, preventive maintenance, diagnostic monitoring, troubleshooting, firmware updates, and so on. The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a system management server application program (126), a set of computer program instructions that operate the system management server so as to automatically under program control carry out processes required to manage servers in the data center, including capacity planning, asset tracking, preventive maintenance, diagnostic monitoring, troubleshooting, firmware updates, and so on. An example of a system management server application program (126) that can be improved to apply firmware updates to servers in a data center according to embodiments of the present invention is IBM's 'Director.'

Also stored in RAM (168) is a server failover module (130), a module of computer program instructions for automatic administration of server failover. The transfer of operation from a failing active server to an available standby server so as to ensure uninterrupted data flow, operability, and data processing services for users of the data center is referred to in this specification as 'failover.' Failover is the automated substitution of a functionally equivalent standby server for a failing active server. Failures that lead to failover can include a loss of power to an active server, a memory fault in an active server, a processor defect in an active server, loss of network connectivity for an active server, and so on. The data center (120) in this example provides automated failover from a failing active server to a standby server through the server failover module (130) of the system management server (152). An example of a server failover module that can be improved for applying firmware updates to servers in a data center according to embodiments of the present invention is IBM's 'Boot From SAN Blade Failover Extension for IBM Director.'

Also stored in RAM (168) is an update module (132), a module of computer program instructions that automates to process of applying firmware updates. The update module may be programmed, for example, to organize firmware updates by machine type and operating system type, track which firmware updates have already been installed on each server in the data center, and apply firmware updates newly received from vendors or manufacturers to servers that have not yet received such new firmware updates. An example of an update module that can be improved for applying firmware updates to servers in a data center according to embodiments of the present invention is IBM's 'Director Update Manager.' Also stored in RAM (168) are firmware updates (128), modules of computer program instructions for installation as firmware in servers of the data center.

Under control of the system management server application program (126), the system management server (152) in this example, operates generally to apply firmware updates to servers in the data center (120) by:

applying the firmware updates to a standby server (102);
selecting an active server (118) for firmware updating;
powering off the selected active server (118);
remapping the standby server (102) to the remote computer boot storage (110, 122) for the selected active server (118);
rebooting the standby server (102) from the remote computer boot storage (110, 122) for the selected active server (118), designating the standby server (102) as an active server;
remapping the selected active server (118) from the remote computer boot storage (110, 122) for the selected active server (118) to the remote computer boot storage (110, 124) formerly mapped to the standby server (102); and
rebooting the selected active server (118) from the remote computer boot storage (110, 124) formerly mapped to the standby server (102), designating the selected active server (118) as a standby server.

The active servers (106) can include a group of active servers (108) of a same type, where the standby server (102) is of the same type as the group of active servers of a same type, and the system management server can repeat the steps of:

applying the firmware updates to a standby server (102);
selecting an active server (118) for firmware updating;
powering off the selected active server (118);
remapping the standby server (102) to the remote computer boot storage (110, 122) for the selected active server (118);
rebooting the standby server (102) from the remote computer boot storage (110, 122) for the selected active server (118), designating the standby server (102) as an active server;
remapping the selected active server (118) from the remote computer boot storage (110, 122) for the selected active server (118) to the remote computer boot storage (110, 124) formerly mapped to the standby server (102); and
rebooting the selected active server (118) from the remote computer boot storage (110, 124) formerly mapped to the standby server (102), designating the selected active server (118) as a standby server;

once for each active server in the group of active servers of a same type until firmware updates are applied to all the active servers in the group of active server of a same type. The pool of (104) of available standby servers can include standby servers of more than one type—according to machine type and operating system type, for example. The system management server can then begin a firmware update process by first selecting the standby server (102) from the pool (104) of available standby servers in dependence upon the type of active servers in the group of active servers of a same type.

The system management server's applying the firmware updates to the standby server (102) can include booting the standby server (102) through a Preboot Execution Environment ('PXE') to an update service of the system management server, for example, an update service of the update management module (132). Booting to the update service means that the first application sought by the standby server (102) for execution after the boot is the update service of the update management module. The PXE is an environment for network booting, booting servers using a network interface card independently of available data storage devices (like hard disks) or installed operating systems. PXE is described in a specification (v2.1) published by Intel and Systemsoft on Sep. 20, 1999. It makes use of several network protocols like IP, UDP, DHCP and TFTP and of concepts like GUID/UUID and Universal Network Device Interface and extends the firmware of the PXE client (the server to be bootstrapped via PXE) with a set of predefined APIs.

Also stored in RAM (168) is an operating system (154). Operating systems useful for applying firmware updates to servers in a data center according to embodiments of the present invention include UNIX™, Linux™, Microsoft XP™, AIX™, IBM's i5/OS™, and others as will occur to those of skill in the art. The operating system (154), the firmware updates (128), the system management server application program (126), the update management module (132), and the server failure module (130) in the example of FIG. 1 are shown in RAM (168), but many components of such software typically are stored in non-volatile memory also, such as, for example, on a disk drive (170).

The system management server (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in system management servers for applying firmware updates to servers in a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM' or 'Flash' memory) (134), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary system management server (152) of FIG. 1 includes a communications adapter (167) that couples the system management server for data communications with other servers in the data center through a data communications network (100). Such a data communication network (100) may be implemented with external buses such as a Universal Serial Bus ('USB'), or as an Internet Protocol ('IP') network or an Ethernet™ network, an I²C network, a System Management Bus ('SMBus'), an Intelligent Platform Management Bus ('IPMB'), for example, and in other ways as will occur to those of skill in the art. Communications adapters implement the hardware level of data communications through which one computer sends data communications to another computer, directly or through a data communications network. Examples of communications adapters useful for applying firmware updates to servers in a data center according to embodiments of the present invention include Ethernet (IEEE 802.3) adapters for wired data communications network communications and 802.11 adapters for wireless data communications network communications.

The arrangement of servers and other devices making up the exemplary system illustrated in FIG. 1 are for explanation, not for limitation. Data processing systems useful for applying firmware updates to servers in a data center according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
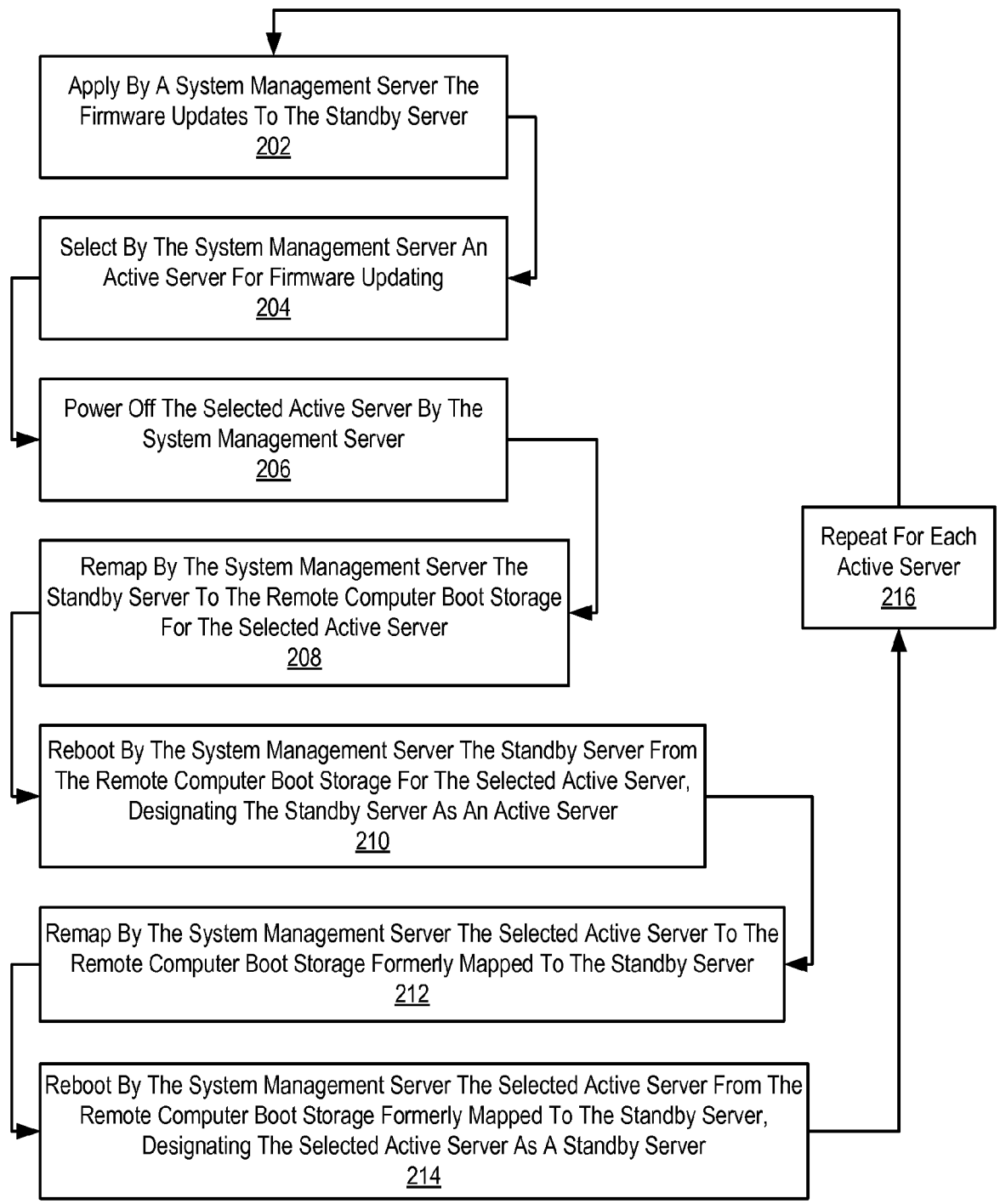
FIG. 2 sets forth a flow chart illustrating an exemplary method of applying firmware updates to servers in a data center according to embodiments of the present invention.

For further explanation, FIG. 2 sets forth a flow chart illustrating an exemplary method of applying firmware updates to servers in a data center according to embodiments of the present invention. The method of FIG. 2 is explained with reference both to FIGS. 1 and 2. In the method of FIG. 2, the servers (104, 106) to which the method is applied include one or more active servers (106) and a standby server (102), where each server is mapped (115, 116) to separate remote computer boot storage (110, 122, 124). The method of FIG. 2 is implemented among servers in a data center (120) that supports a server failover service (130) and a firmware update service (132).

The method of FIG. 2 includes applying (202) by a system management server (152) the firmware updates (128) to the standby server (102). The servers in the data center (120) may include a pool (1043 of available standby servers of differing types, and the active servers (106) may include a group of active servers (108) of a same type. The group of active servers (108) of a same type may all be, for example, IBM iSeries servers running a particular version of the Windows™ operating system. Or they may be Cisco™ servers of a particular model all running a particular version of Linux. And so on. Applying (202) the firmware updates (128) to the standby server (102) then may be carried out by first selecting the standby server (102) from the pool (104) of available standby servers in dependence upon the type of active servers in the group (108) of active servers of a same type. If the group (108) of active servers of a same type are all IBM servers running Windows, then the standby server (102) is selected as a standby IBM server running Windows—and therefore needing the same firmware updates as are needed by the group (108) of active servers of a same type. If the group (108) of active servers of a same type are all Cisco servers running Linux, then the standby server (102) is selected as a standby Cisco server running Linux. And so on.

In the method of FIG. 2, applying (202) the firmware updates (128) to the standby server (102) can be carried out by an update management module (132) of the system management server. In the method of FIG. 2, applying (202) the firmware updates (128) can include booting the standby server (102) through a Preboot Execution Environment ('PXE') to an update service of the system management server (152)—in this example, the update service being a process of the update management module (132).

The method of FIG. 2 also includes selecting (204) by the system management server an active server for firmware updating—because the process for updating the firmware is applied to one active server at a time. The method of FIG. 2 also includes powering off (206) the selected active server by the system management server. Leaving the selected active server powered on would risk memory access conflicts when the standby server (102) is remapped to and booted from the selected active server's remote boot storage (122).

The method of FIG. 2 also includes remapping (208) by the system management server (152) the standby server (104) to the remote computer boot storage (110, 122) for the selected active server (118) and rebooting (210) by the system management server (152) the standby server (104) from the remote computer boot storage (110, 122) for the selected active server (118), designating the standby server (102) as an active server. Now the selected active server (118) has effectively failed over to the standby server (102), replacing the selected active server (118) with the standby server (102) which is now designated as an active server. The only difference now between the selected active server and the newly designated active server, from the point of view of the data center, is that this newly designated active server includes a complete set of new firmware updates.

The method of FIG. 2 also includes remapping (212) by the system management server (152) the selected active server (118) from the remote computer boot storage (110, 122) for the selected active server (118) to the remote computer boot storage (110, 124) formerly mapped to the standby server (102) and rebooting (214) by the system management server (152) the selected active server (118) from the remote boot storage (110, 122) formerly mapped to the standby server (102), designating the selected active server (118) as a standby server. The remote boot storage used here is said to be the remote computer boot storage (110, 124) 'formerly' mapped to the standby server (102) because, in step (208) above, the system management server remapped the standby server to the remote computer boot storage for the selected active server. At this point of processing in the method of FIG. 2, the selected active server has effectively replaced the standby server (102) as a standby server. So in effect a kind of exchange or swap has been achieved in which a selected active server failed over to a standby, the standby became active, and the selected active server replaced the standby server.

Now the newly designated standby server has not had its firmware updated. The entire process can be repeated (216), however, applying firmware updates to the newly designated standby server, failing over a new selected active server to the standby server, and replacing the now-updated standby server with the new selected active server—continuing in a loop until all the active servers in the data center have applied firmware upgrades. In the method of FIG. 2, moreover, the active servers (106) can include a group (108) of active servers of a same type, where the standby server (102) is of the same type as the group (108) of active servers of the same type, and the method is carried out by repeating (216) the steps of the method until firmware updates (128) are applied to all the active servers in the group (108) of active servers of a same type.

In the method of FIG. 3, these steps:

powering off (206) the selected active server remapping (208) the standby server to the remote computer boot storage for the selected active server rebooting (210) the standby server from the remote computer boot storage for the selected active server remapping (212) the selected active server to the remote computer boot storage formerly mapped to the standby server; and rebooting (214) the selected active server from the remote boot storage formerly mapped to the standby server;

may optionally be carried out by a server failover module (130) of a system management server (152). An update management module (132) and a server failover module (130) may cooperate, so that the update management module applies (202) firmware updates to a standby server, selects (204) an active server for further updating, and calls the server failover module (130), identifying the selected active server. The server failover module then fails the selected active server over to the standby server, remaps the boot storage, reboots the standby server and the selected active server, and notifies the update management module of completion of one upgrade. If there are more active servers to have firmware upgrades, the process loops until all active servers needed firmware upgrades have received them.

In view of the explanations set forth above, readers will recognize that the benefits of applying firmware updates to servers in a data center according to embodiments of the present invention include limiting the number of server reboots required to apply a firmware upgrade. For example: For the case of N active servers of a type updated according to embodiments of the present invention beginning with one standby server of the same type, the number of required reboots is N+1.

Exemplary embodiments of the present invention are described largely in the context of a fully functional computer system for applying firmware updates to servers in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of applying firmware updates to servers in a data center, the servers comprising one or more active servers and a standby server, each server mapped to separate remote computer boot storage, the method comprising:
    applying by a system management server the firmware updates to the standby server;
    selecting by the system management server an active server for firmware updating;
    powering off the selected active server by the system management server;
    remapping by the system management server the standby server to the remote computer boot storage for the selected active server;
    rebooting by the system management server the standby server from the remote computer boot storage for the selected active server, designating the standby server as an active server;
    remapping by the system management server the selected active server to the remote computer boot storage formerly mapped to the standby server; and
    rebooting by the system management server the selected active server from the remote boot storage formerly mapped to the standby server, designating the selected active server as a standby server.

2. The method of claim 1 wherein the active servers comprise a group of active servers of a same type, the standby server is of the same type as the group of active servers of the same type, and the method includes repeating the steps of the method until firmware updates are applied to all the active servers in the group of active servers of a same type.

3. The method of claim 1 wherein:
    the servers further comprise a pool of available standby servers of differing types;
    the active servers comprise a group of active servers of a same type; and
    applying the firmware updates to the standby server further comprises first selecting the standby server from the pool of available standby servers in dependence upon the type of active servers in the group of active servers of a same type.

4. The method of claim 1 wherein applying the firmware updates further comprises booting the standby server through a Preboot Execution Environment ('PXE') to an update service of the system management server.

5. The method of claim 1 wherein applying by a system management server the firmware updates to the standby server further comprises applying the updates by an update management module of the system management server.

6. The method of claim 1 wherein:
    powering off the selected active server further comprises powering off the selected active server by a server failover module of the system management server;
    remapping the standby server to the remote computer boot storage for the selected active server further comprises remapping, by a server failover module of the system management server, the standby server to the remote computer boot storage for the selected active server;
    rebooting the standby server from the remote computer boot storage for the selected active server further comprises rebooting, by a server failover module of the system management server, the standby server from the remote computer boot storage for the selected active server;
    remapping the selected active server to the remote computer boot storage formerly mapped to the standby server further comprises remapping, by a server failover module of the system management server, the selected active server to the remote computer boot storage formerly mapped to the standby server; and
    rebooting the selected active server from the remote boot storage formerly mapped to the standby server further comprises rebooting, by a server failover module of the system management server, the selected active server from the remote boot storage formerly mapped to the standby server.

7. Apparatus for applying firmware updates to servers in a data center, the servers comprising one or more active servers and a standby server, each server mapped to separate remote computer boot storage, the apparatus comprising a computer processor and a computer memory operatively coupled to the computer processor, the computer memory having disposed within it computer program instructions, that when executed by the computer processor, cause the computer processor to carry out the steps of:
applying by a system management server the firmware updates to the standby server;
selecting by the system management server an active server for firmware updating;
powering off the selected active server by the system management server;
remapping by the system management server the standby server to the remote computer boot storage for the selected active server;
rebooting by the system management server the standby server from the remote computer boot storage for the selected active server, designating the standby server as an active server;
remapping by the system management server the selected active server to the remote computer boot storage formerly mapped to the standby server; and
rebooting by the system management server the selected active server from the remote boot storage formerly mapped to the standby server, designating the selected active server as a standby server.

8. The apparatus of claim 7 wherein:
the servers further comprise a pool of available standby servers of differing types;
the active servers comprise a group of active servers of a same type; and
applying the firmware updates to the standby server further comprises first selecting the standby server from the pool of available standby servers in dependence upon the type of active servers in the group of active servers of a same type.

9. The apparatus of claim 7 wherein applying the firmware updates further comprises booting the standby server through a Preboot Execution Environment ('PXE') to an update service of the system management server.

10. The apparatus of claim 7 wherein applying by a system management server the firmware updates to the standby server further comprises applying the updates by an update management module of the system management server.

11. The apparatus of claim 7 wherein:
powering off the selected active server further comprises powering off the selected active server by a server failover module of the system management server;
remapping the standby server to the remote computer boot storage for the selected active server further comprises remapping, by a server failover module of the system management server, the standby server to the remote computer boot storage for the selected active server;
rebooting the standby server from the remote computer boot storage for the selected active server further comprises rebooting, by a server failover module of the system management server, the standby server from the remote computer boot storage for the selected active server;
remapping the selected active server to the remote computer boot storage formerly mapped to the standby server further comprises remapping, by a server failover module of the system management server, the selected active server to the remote computer boot storage formerly mapped to the standby server; and
rebooting the selected active server from the remote boot storage formerly mapped to the standby server further comprises rebooting, by a server failover module of the system management server, the selected active server from the remote boot storage formerly mapped to the standby server.

12. A computer program product for applying firmware updates to servers in a data center, the servers comprising one or more active servers and a standby server, each server mapped to separate remote computer boot storage, the computer program product disposed in a recordable medium, the computer program product comprising computer program instructions that, when executed by a computer processor, cause the computer processor to carry out the steps of:
applying by a system management server the firmware updates to the standby server;
selecting by the system management server an active server for firmware updating;
powering off the selected active server by the system management server;
remapping by the system management server the standby server to the remote computer boot storage for the selected active server;
rebooting by the system management server the standby server from the remote computer boot storage for the selected active server, designating the standby server as an active server;
remapping by the system management server the selected active server to the remote computer boot storage formerly mapped to the standby server; and
rebooting by the system management server the selected active server from the remote boot storage formerly mapped to the standby server, designating the selected active server as a standby server.

13. The computer program product of claim 12 wherein:
the servers further comprise a pool of available standby servers of differing types;
the active servers comprise a group of active servers of a same type; and
applying the firmware updates to the standby server further comprises first selecting the standby server from the pool of available standby servers in dependence upon the type of active servers in the group of active servers of a same type.

14. The computer program product of claim 12 wherein applying the firmware updates further comprises booting the standby server through a Preboot Execution Environment ('PXE') to an update service of the system management server.

15. The computer program product of claim 12 wherein applying by a system management server the firmware updates to the standby server further comprises applying the updates by an update management module of the system management server.

16. The computer program product of claim 12 wherein:
powering off the selected active server further comprises powering off the selected active server by a server failover module of the system management server;
remapping the standby server to the remote computer boot storage for the selected active server further comprises remapping, by a server failover module of the system management server, the standby server to the remote computer boot storage for the selected active server;

rebooting the standby server from the remote computer boot storage for the selected active server further comprises rebooting, by a server failover module of the system management server, the standby server from the remote computer boot storage for the selected active server;

remapping the selected active server to the remote computer boot storage formerly mapped to the standby server further comprises remapping, by a server failover module of the system management server, the selected active server to the remote computer boot storage formerly mapped to the standby server; and rebooting the selected active server from the remote boot storage formerly mapped to the standby server further comprises rebooting, by a server failover module of the system management server, the selected active server from the remote boot storage formerly mapped to the standby server.

\* \* \* \* \*